(12) United States Patent
Saeki et al.

(10) Patent No.: US 6,444,903 B2
(45) Date of Patent: Sep. 3, 2002

(54) HINGE STRUCTURE

(75) Inventors: Shinichi Saeki; Ikuo Takeda, both of Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/739,647

(22) Filed: Dec. 20, 2000

(30) Foreign Application Priority Data

Dec. 20, 1999 (JP) .......................................... 11-360580

(51) Int. Cl.[7] ................................................. H02G 3/04
(52) U.S. Cl. ........................ 174/48; 174/72 A; 174/135
(58) Field of Search ......................... 174/48, 49, 68.3, 174/95, 99 R, 97, 71 R, 72 A, 136, 135; 220/3.3, 4.02, 4.01; 52/220.1, 220.3, 220.5, 220.7; 59/78, 78.1; 385/136

(56) References Cited

U.S. PATENT DOCUMENTS

| | | | | |
|---|---|---|---|---|
| 3,711,633 A | * | 1/1973 | Ghirardi et al. | 174/135 |
| 4,611,868 A | * | 9/1986 | Matsui et al. | 174/135 |
| 4,650,925 A | * | 3/1987 | Coldren | 174/135 |
| 4,797,512 A | * | 1/1989 | Kumagai et al. | 174/135 |
| 5,332,866 A | * | 7/1994 | Sawamura | 174/48 |
| 5,469,893 A | * | 11/1995 | Caveney | 174/68.3 |
| 5,509,100 A | * | 4/1996 | Garnett et al. | 385/136 |
| 5,834,694 A | * | 11/1998 | Bakker et al. | 174/135 |
| 6,037,543 A | * | 3/2000 | Nicoli et al. | 174/49 |
| 6,291,774 B1 | * | 9/2001 | Williams | 174/135 |

FOREIGN PATENT DOCUMENTS

| | | |
|---|---|---|
| JP | 63-17510 | 2/1988 |
| JP | 64-6719 | 1/1989 |
| JP | 4-131114 | 12/1992 |

* cited by examiner

Primary Examiner—Dean A. Reichard
Assistant Examiner—Angel R. Estrada
(74) Attorney, Agent, or Firm—Morgan, Lewis & Bockius LLP

(57) ABSTRACT

A hinge structure accommodates a wire harness formed by bundling a plurality of electric wires to be used in, for example, wiring in a car, including a first member having a first non-planar rigid surface, a second member, and a first hinge member contiguously connecting the first non-planar rigid surface and the second member.

4 Claims, 8 Drawing Sheets

HINGE STRUCTURE

BACKGROUND OF THE INVENTION

1. Technical Field

The present invention relates to hinge structure formed between two members, for example, hinge structure of a bending portion of a protector cover for wire protection, and particularly to hinge structure that enables, in a bending portion of a protector in which electric wires such as a wire harness or the like are bent to be laid down according to a shape of a side on which the wires are fixed, the electric wires stored in the protector not to receive excessive bending stress.

2. Related Art

In case that a wire harness formed by bundling a plurality of electric wires is wired in a car body, a protector made of resin is generally used in order to prevent the wire harness from coming into contact with other members when the wire harness is held in the predetermined wiring position, and protect the wire harness properly. This protector requires various modes according to a shape of a side on which the wire harness is fixed. However, it is not economical to prepare all their modes according to the shape of the side on which the wire harness is fixed. For example, in case of a shape in which a center portion is bent at a right angle, a hinge portion is provided and the protector is correspondingly bent at its hinge portion. This protector, which has the center portion bent at a right angle and a protector cover that covers an entire opening side surface of the protector and has a shape of a lid, has been disclosed in JP-A-63-17510U and JP-A-64-6719U, and it has the constitution shown in FIG. 7.

In the figure, a protector 1 includes a protector body 3 which is opened upward, formed according to the shape of the side on which electric wires are fixed, for example, substantially in the shape of L, and stores electric wires 2 (for example, wire harness) therein; and a protector cover 5 for closing an opening portion 4 of this protector body 3.

This protector body 3 is composed of a first housing portion 10, a second housing portion 14 and a hinge portion 15. The first housing portion 10 includes a bottom portion 7 and a pair of side walls 8,9 erectly formed on both sides of this bottom portion 7. The second housing portion 14 includes a bottom portion 11 and a pair of side walls 12, 13 erectly formed on both sides of this bottom portion 11. The hinge 15 joins these first and second housing portions 10, 14 so that they can be bent. The protector cover 5 is used in order to close the protector body 3, and composed of a first cover portion 19, a second cover portion 23, and the a hinge 24. The first cover portion 19 includes a lid portion 16 and a pair or side walls 17, 18 erectly formed on both sides of this lid portion 16 and that closes the first housing portion 10. The second cover portion 23 includes a lid portion 20 and a pair of side walls 21, 22 erectly formed on both sides of this lid portion 20 and that closes the second housing portion 14. The hinge 24 joins the first cover portion 19 and the second cover portion 23 that they can be bent.

In the thus structured protector 1, firstly, the protector body 3 is attached along a fixing member onto which it is fixed as shown in FIG. 7. And, the wire harness (electric wires) 2 is stored in the protector body 3 along the protector body 3, and the first cover portion 19 is fitted to the first housing portion 10 in such a manner that fitting claws (not shown) provided for the side walls 17, 18 of the first cover portion 19 are inserted into lock portions (not shown) of the first housing portion 10. By this fitting, the first cover portion 19 closes the first housing portion 10. This fitting of the first step makes a state where a half of the protector body 3 is covered with the protector cover 5.

Next, the second cover portion 23 is rotated toward the second housing portion 14 so as to be bent at the hinge portion 24. And, the second cover portion 23 is fitted to the second housing portion 14 in such a manner that fitting claws (not shown) provided for the side walls 21, 22 of the second cover portion 23 are inserted into lock portions (not shown) of the second housing portion 14. By this fitting, the second cover portion 23 closes the second housing portion 14. By this fitting of the second step, the incorporation of the second cover portion 23 and the second housing portion 14 is completed, and the other half portion of the protector body 3 is covered with the protector cover 5, so that the assembly of the protector 1 is completed.

In case that the protector is thus bent and laid according to the shape of the side on which the protector is fixed, and the electric wires are laid along this protector, bending of the bending portion is provided by only the hinge 15 in the related hinge structure, as shown in FIG. 8. Therefore, the bending R is small, so that there is a problem that the wire harness is stretched at the joint portions of the hinge 15 and the bottom portions 7, 11 on the opposite side to the bending side and excessive bending stress is applied onto the wire harness.

SUMMARY OF THE INVENTION

An object of the invention is to prevent the electric wires stored in the members which are bent and laid according to the shape of the side on which the members are fixed from receiving the excessive bending stress at the bending portion.

In order to achieve the above object, a hinge structure includes a first member, a second member, a first hinge member which joins the first member and second member, and at least one curved surface member provided at least one of the first member and second member.

By this constitution, according to the present invention, it is possible to prevent the electric wires stored in the members that are bent and laid according to the shape of the side on which the members are fixed from receiving the excessive bending stress at the bending portion.

In order to achieve the above object, the two members are formed by the protector cover for closing the opening surface of the protector body that has the side walls formed erectly on both sides and the opening portion in which one surface is opened.

By this constitution, according to the present invention, it is possible to prevent the electric wires stored in the protector that is bent and laid according to the shape of the side on which the protector is fixed from receiving the excessive bending stress at the bending portion.

Further, the hinge structure may be formed by a protector comprising a protector body having side walls erectly formed on both sides of a bottom portion, an opening portion in which one surface is opened, and one or more than two bending portions formed at the proper position; and a protector cover having the shape corresponding to the protector body, which has side walls erectly formed on both side portions of a lid portion, an opening portion in which one surface is opened, one or more than two bending portions formed at the proper position, and a hinge between lid portions at the bending portion, and which closes the opening portion of the aforesaid protector body. And, at the lid portion of the protector cover, one or more than two curved surfaces are formed so as to protrude on the opening portion side at a predetermined distance from a hinge forming end portion of this lid portion.

By this constitution, it is possible to prevent the electric wires stored in the protector that is bent and laid on the protector cover side according to the shape of the side on which the protector is fixed from receiving the excessive bending stress at the bending portion.

Further, the hinge structure may be formed by a protector comprising a protector body having side walls erectly formed on both sides of a bottom portion, an opening portion in which one surface is opened, one or more than two bending portions formed at the proper position, and a hinge between a bottom portions of the bending portion; and a protector cover having the shape corresponding to the protector body, which has side walls erectly formed on both side portions of a lid portion, an opening portion in which one surface is opened, one or more than two bending portions formed at the proper position, and a hinge between lid portions at the bending portion, and which closes the opening portion of the aforesaid protector body. And, at the bottom portion of the protector body, one or more than two curved surfaces are formed so as to protrude on the opening portion side at a predetermined distance from a hinge forming end portion of this bottom portion.

By this constitution, it is possible to prevent the electric wires stored in the protector that is bent and laid according to the shape of the side on which the protector is fixed from receiving the excessive bending stress at the bending portion.

DETAILED DESCRIPTION OF PREFERRED EMBODIMENT

Modes for carrying out hinge structure according to the invention will be described below. Regarding the hinge structure according to this invention, hinge structure of a protector will be described by way of example.

Figure 1:
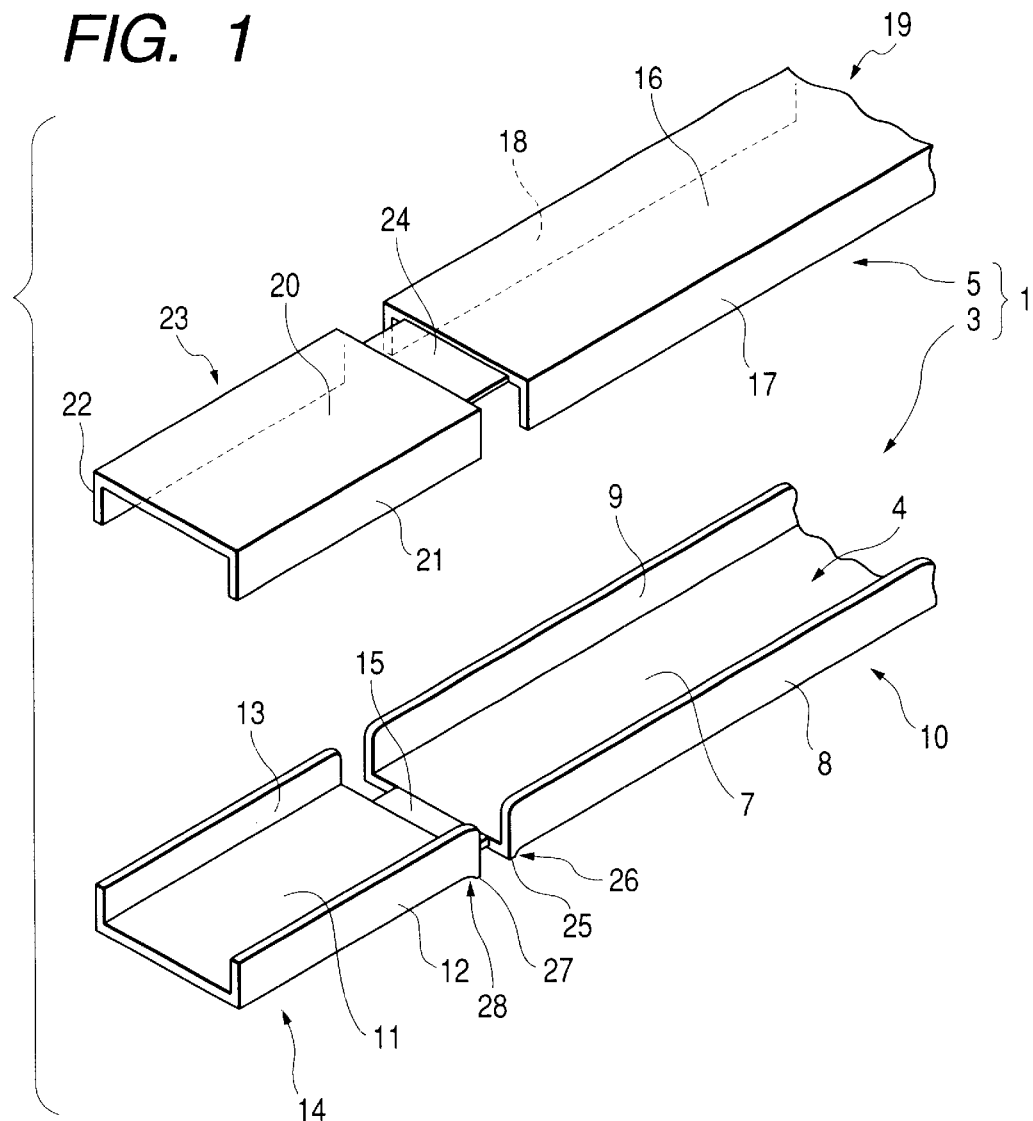
FIG. 1 is an assembly perspective view of a protector showing a mode for carrying out hinge structure of a protector according to the invention.

FIG. 1 shows a protector having the hinge structure of the protector according to the invention.

In the figure, the protector 1 is composed of a protector body 3 for storing electric wires (for example, wire harness) therein and a protector cover 5 for closing an opening portion 4 of this protector body 3. The protector body 3 has a rectangular section and it is formed cylindrically and straight with the opening portion 4 upward.

This protector body 3 has a first housing portion 10 including a bottom portion 7 and a pair of side walls 8, 9 that are erectly formed on both sides of this bottom portion 7; and a second housing portion 14 including a bottom portion 11 and a pair of side walls 12, 13 that are erectly formed on both sides of this bottom portion 11. These first housing portion 10 and second housing portion 14 are joined by a hinge 15 so that they can be bent.

Figure 2:
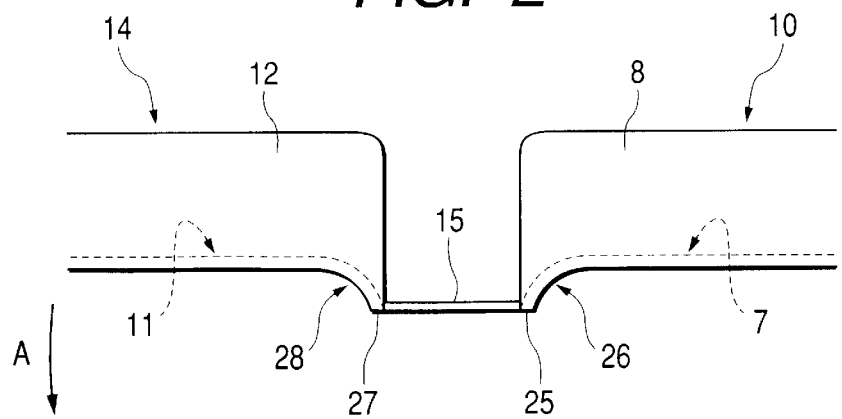
FIG. 2 is a partially enlarged view of a protector body shown in FIG. 1.

At the bottom portion 7 of the first housing portion 10 of the protector body 3, as shown in FIG. 2, a curved surface 26 is formed so as to protrude on the opening portion 4 side by a predetermined distance from a joint end portion 25 to the hinge 15. If a bending angle of the first housing portion 10 and second housing portion 14 is previously known, this curved surface 26 can be previously formed with proper curvature according to its bending angle. Further, by setting the curvature of the curved surface 26 to a maximum bending angle (for example, 90°) of the first housing portion 10 and second housing portion 14, this curved surface 26 can correspond to all the bending angles.

At the bottom portion 11 of the second housing portion 14 of the protector body 3, as shown in FIG. 2, a curved surface 28 is formed so as to protrude on the opening portion 4 side by a predetermined distance from a joint end portion 27 to the hinge 15. If a bending angle of the first housing portion 10 and second housing portion 14 is previously known, this curved surface 28 can be previously formed with proper curvature according to its bending angle. Further, by setting the curvature of the curved surface 28 to a maximum bending angle (for example, 90°) of the first housing portion 10 and second housing portion 14, this curved surface 26 can correspond to all the bending angles.

The curved surfaces 26, 28 are provided for the first housing portion 10 and the second housing portion 14 in FIGS. 1 and 2. However, it is not always necessary to provide them for both of the first and second housing portions 10, 14 but the curved surface may be provided for either the first housing portion 10 or the second housing portion 14.

The protector cover 5 is used in order to close the protector body 3, and is composed of a first cover portion 19, a second cover portion 23 and a hinge portion 24. The first cover portion 19 includes a lid portion 16 and a pair of side walls 17, 18 that are erectly formed on both sides of this lid portion 16 and covers the first housing portion 10. The second cover portion 23 includes a lid portion 20 and side walls 21, 22 that are erectly formed on both sides of this lid portion 20, and closes the second housing portion 14. The hinge 24 joins the first cover portion 19 and the second cover portion 23 so that they can be bent.

Figure 3A:
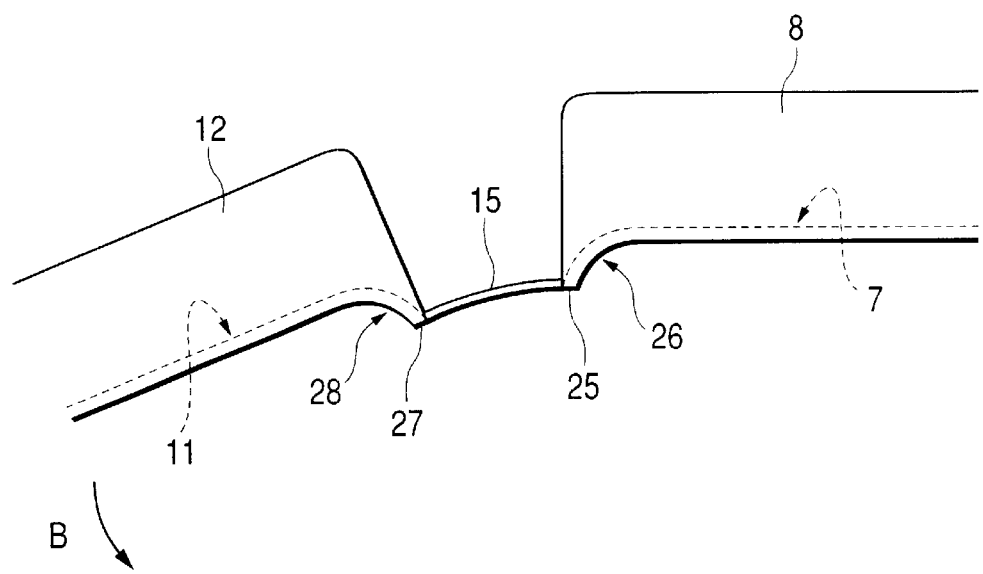
FIG. 3A to FIG. 3D are diagrams showing a state where the protector body shown in FIG. 1 is bending.
Figure 3B:
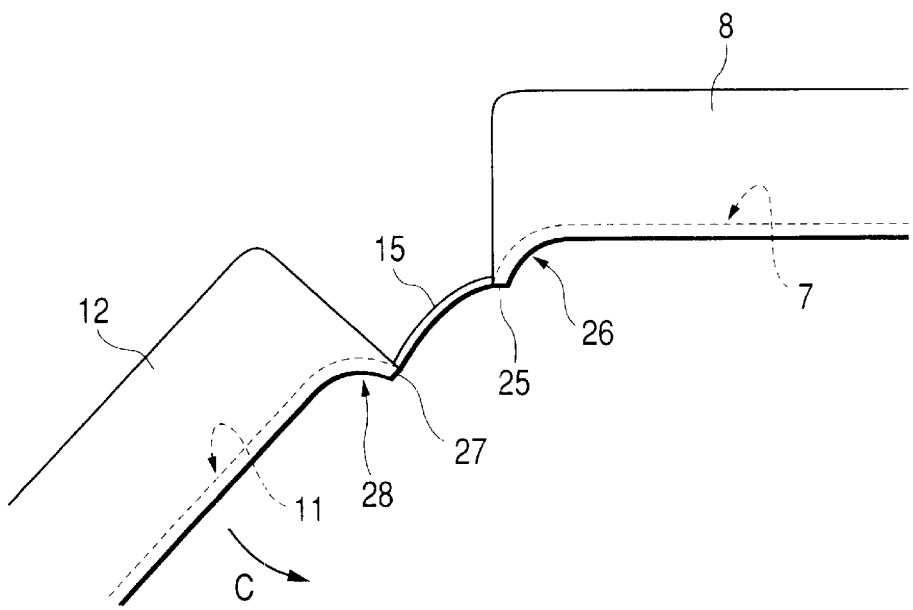
Figure 3C:
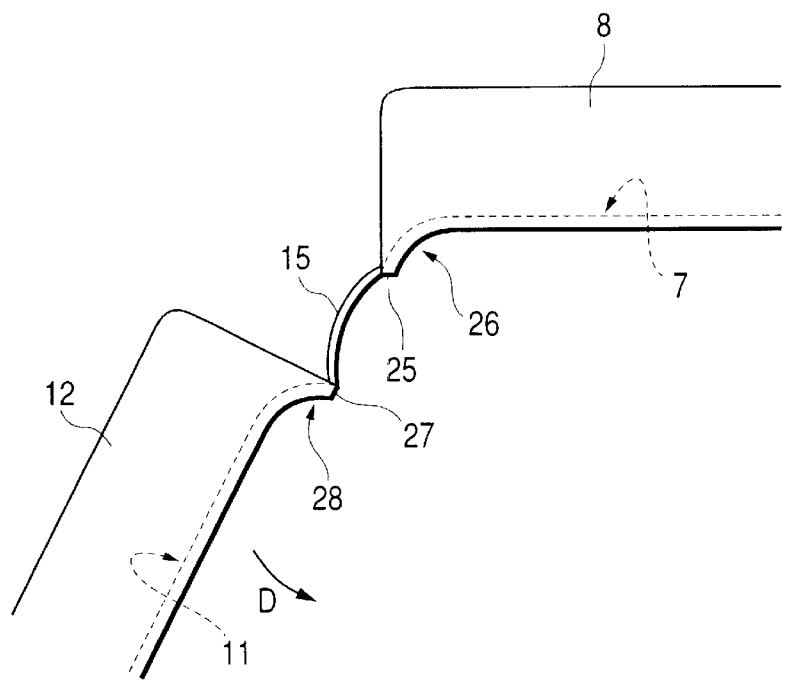
Figure 3D:
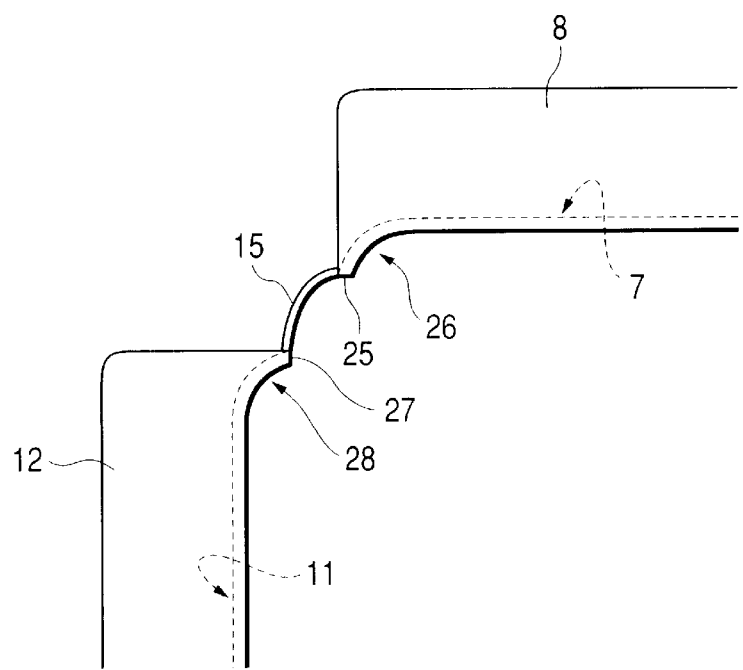

In the thus constructed protector 1, firstly, the bottom portion 7 of the first housing portion 10 of the protector body 3 or the bottom portion 11 of the second housing portion 14 of the protector body 3 is fixed (in this mode, the bottom portion 7 of the first housing portion 10 is fixed). Then, when the bottom portion 11 of the second housing portion 14. of the protector body 3 or the bottom portion 7 of the first housing portion 10 of the same (in the mode, the bottom portion 11 of the second housing portion 14 of the same) is bent along the shape of a fixing member (not shown) in a direction of an arrow A shown in FIG. 2, it is bent to a position shown in FIG. 3A. When it is further bent in a direction of an arrow B, it is bent to a position shown in FIG. 3B. When it is further bent in a direction of an arrow C from the position shown in FIG. 3B, it is bent to a position shown in FIG. 3C. When it is further bent in a direction of an arrow D, it is bent to a position shown in FIG. 3D, that is, at a right angle.

Figure 4:
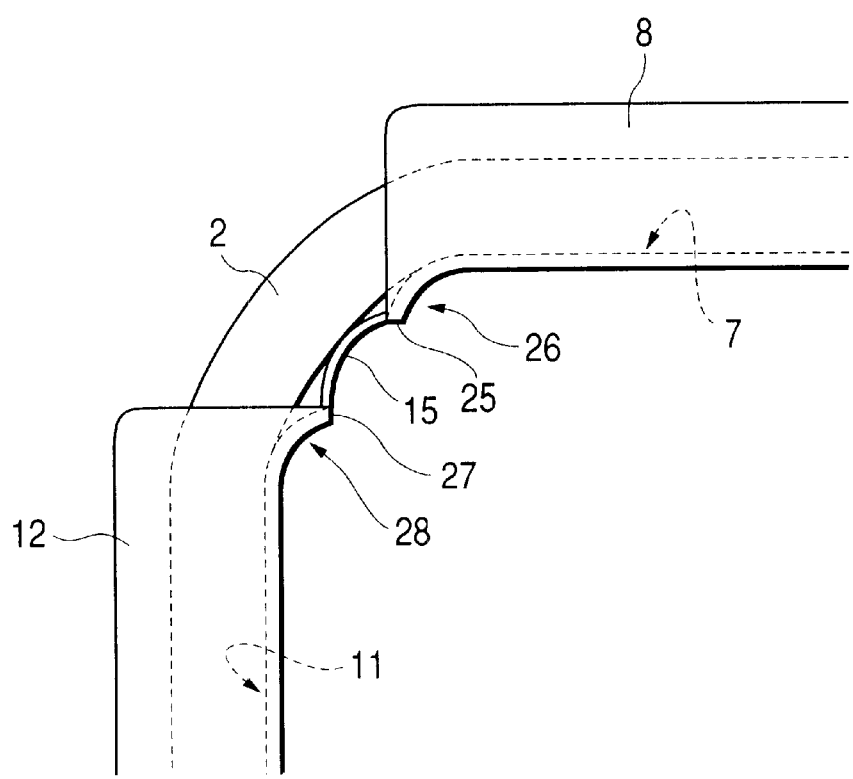
FIG. 4 is a diagram showing a state where a wire harness is stored in the protector body bent as shown in FIG. 3.

In case that electric wires (wire harness) 2 are stored in the protector body 3 in this state, as shown in FIG. 4, they are stored in the first housing portion 10 of the protector body 3, and the wire harness 2 bent at the portion of the hinge 15 is somewhat pushed up by the curved surface 26 formed at the bottom portion 7 of the first housing portion 10, so that bending of the wire harness 2 becomes gentle, and the wire harness is supported by the hinge 15. Therefore, it is prevented that the bending of the wire harness 2 becomes sharp. Further, in case that the wire harness 2 is bent and stored in the second housing portion 14, it is somewhat pushed up by the curved surface 28 formed at the bottom portion 11 of the second housing portion 14 and the bending of the wire harness 2 becomes gentle.

Figure 5:
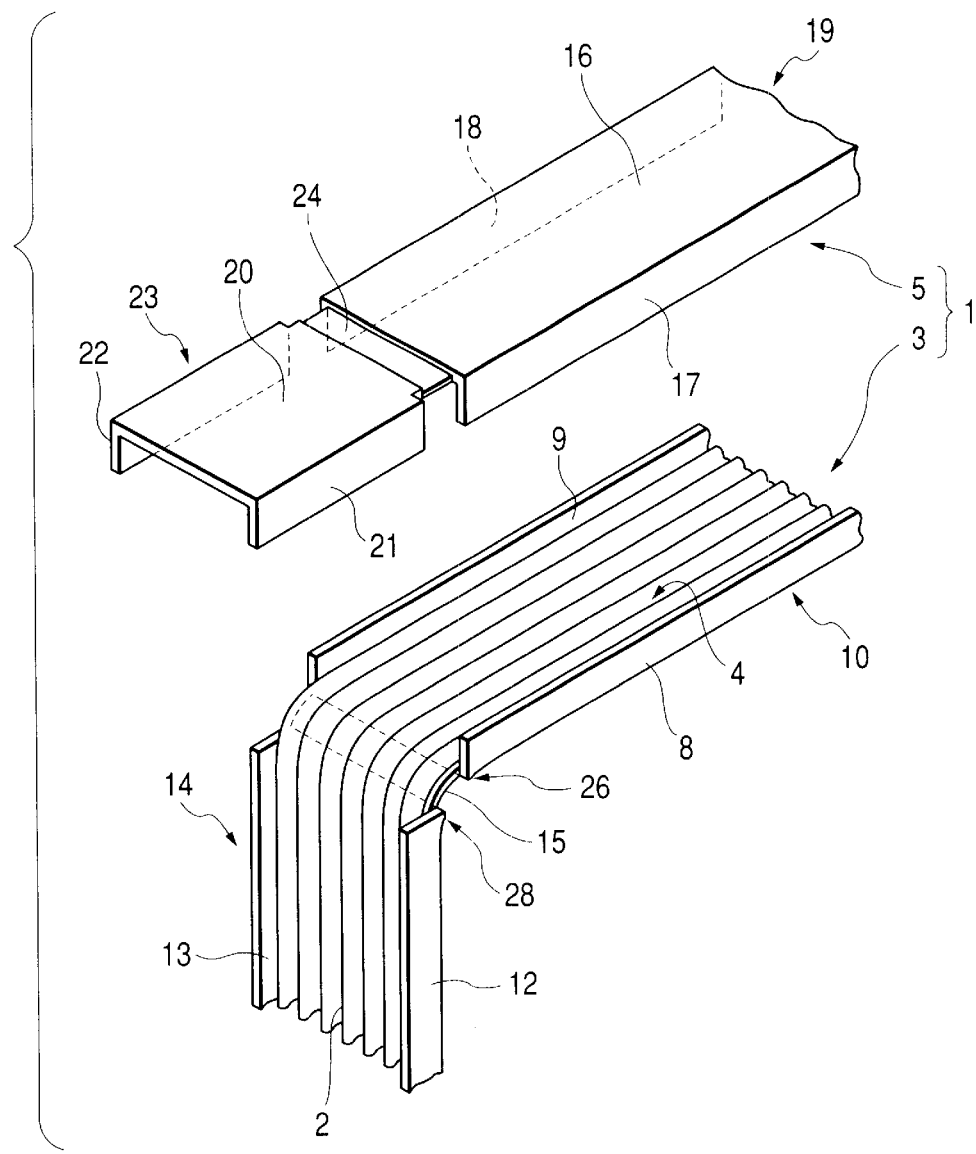
FIG. 5 is an assembly perspective view of the protector, showing a state where the wire harness is stored in the protector body bent as shown in FIG. 3.

When the electric wires (wire harness) 2 are stored in the protector body 3, they become in a state shown in FIG. 5. Namely, the wire harness 2 stored in the first housing portion 10 of the protector body 3 is somewhat pushed up by the curved surface 26 formed at the bottom portion 7 of the first housing portion 10, supported by the hinge 15, and somewhat pushed up by the curved surface 28 formed at the bottom portion 11 of the second housing portion 14 to be stored.

Since the curved surface 26 is formed at the bottom portion 7 of the first housing portion 10, the curved surface 28 is formed at the bottom portion 11 of the second housing portion 14 as described above, it is possible to make the bending of the wire harness 2 large (to make the bending of the wire harness 2 gentle), to prevent the wire harness 2 from being stretched at the bending portion, and to prevent the wire harness 2 from receiving the excessive bending stress at the bending portion. Further, since it is possible to prevent the wire harness 2 from being stretched at the bending portion and to make the bending of the wire harness 2 gentle, the outward appearance of the bending portion of the hinge 15 can be improved.

Further, since the protector body 3 has the rectangular section and it is formed cylindrically with the opening 4 upward and straight, in case that it is injection-molded, molding is performed only once. Therefore, cost of the mold can be reduced and productivity of the protector can be improved.

Figure 6:
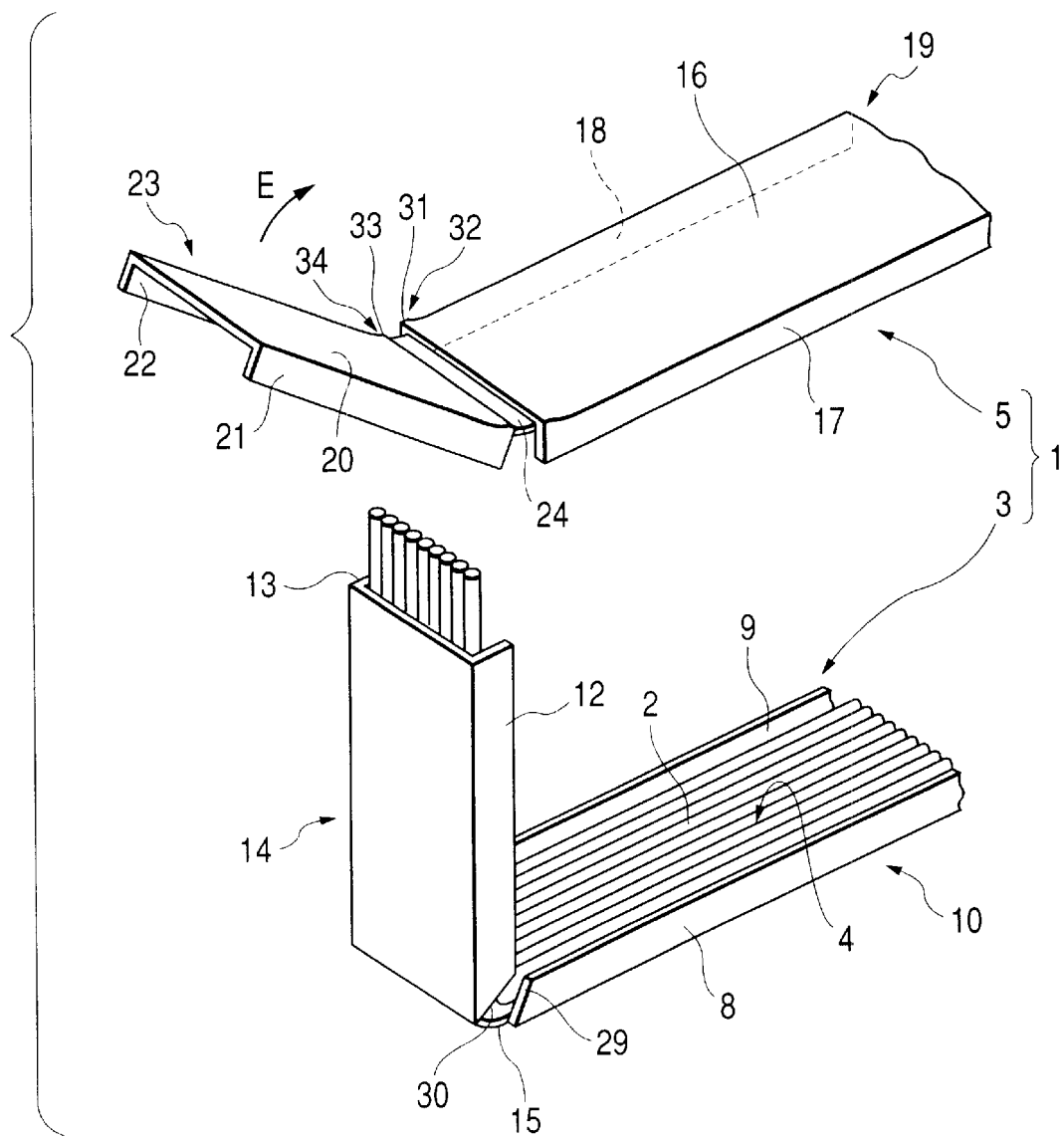
FIG. 6 is an assembly perspective view of a protector, showing another mode for carrying out the hinge structure of the protector according to the invention.
Figure 7:
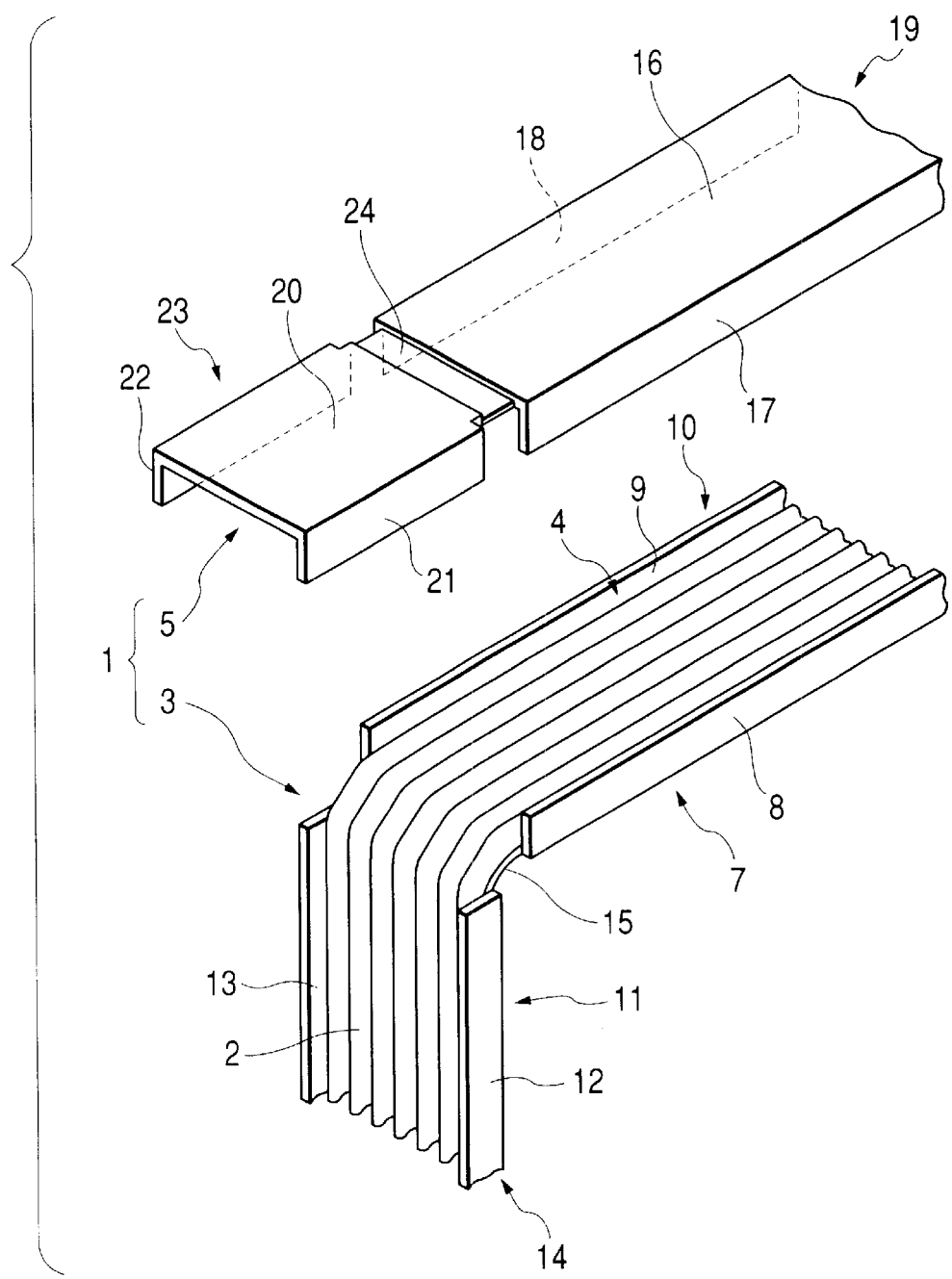
FIG. 7 is an assembly perspective view of a protector showing a related hinge structure of a protector.
Figure 8:
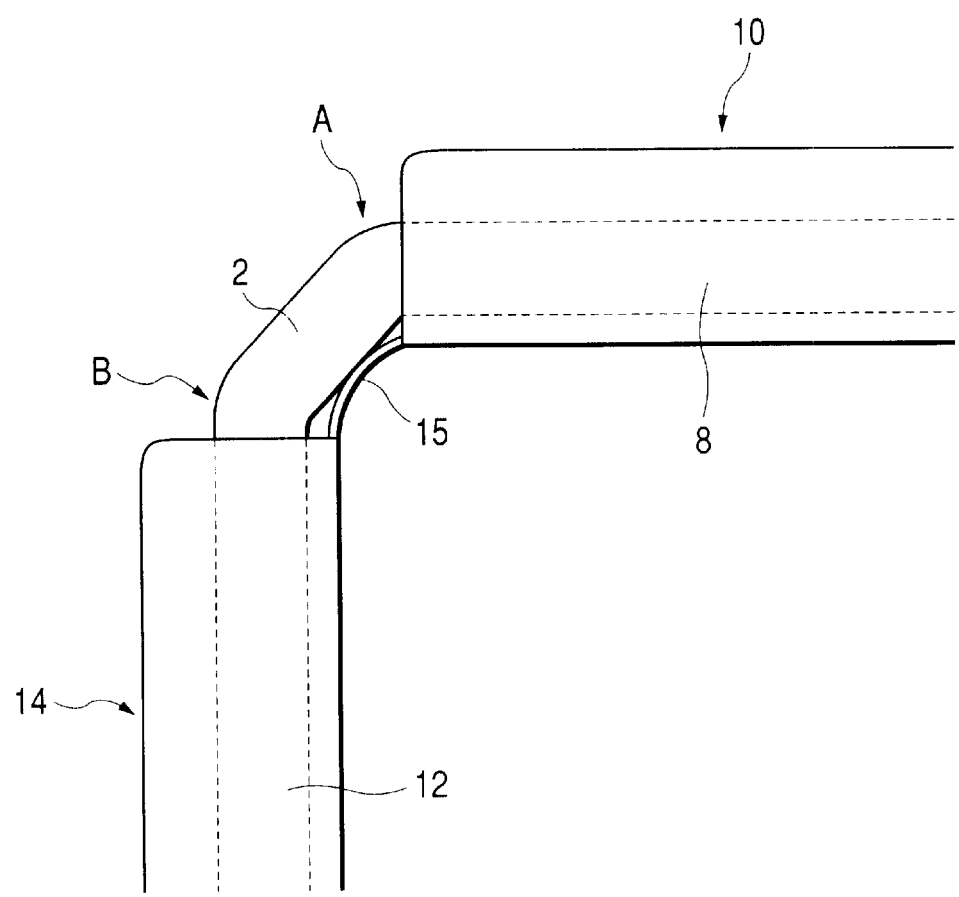
FIG. 8 is a partially enlarged view of a protector body shown in FIG. 7.

FIG. 6 shows another mode for carrying out the hinge structure of the protector as the hinge structure according to the invention.

This mode is an example in case that the protector body 3 is bent at the bending portion of the hinge 15 in such a manner that the opening portion 4 faces inward. Namely, in case that the protector body 3 is bent at the bending portion of the hinge 15, it is not always bent as shown in FIG. 5 but may be bent in such a manner that the opening portion 4 faces inward as shown in FIG. 6. In this case, when the wire harness 2 is stored in the protector body 3, to determine the curvature of the bending of the wire harness 2 at the bending portion of the hinge 15 is performed not by the protector body 3 but by the protector cover 5 that comes into contact with the inside of the bending of the wire harness 2. Therefore, in this mode, curved surfaces 32, 34 are formed at the lid portion 16 of the first cover portion 19 of the protector cover 5 and the lid portion 20 of the second cover portion 23 so as to protrude on the opening portion side.

Namely, a protector 1 is composed of a protector body 3 for storing electric wires (for example, wire harness) therein, and a protector cover 5 for closing an opening portion 4 of this protector body 3. And, the protector body 3 has a rectangular section and it is formed cylindrically and straight with the opening portion 4 upward. Further, this protector body 3 has a first housing portion 10 comprising a bottom portion 7 and a pair of side walls 8, 9 that are erectly formed on both sides of this bottom portion 7; and a second housing portion 14 comprising a bottom portion 11 and a pair of side walls 12, 13 that are erectly formed on both sides of this bottom portion 11. These first housing portion 10 and second housing portion 14 are joined by a hinge 15 so that they can be bent.

An end portion 29 on the hinge 15 side of this side wall 8 and an end portion 30 on the hinge 15 side of the side wall 12 are cut off in a direction distant from the hinge 15 with inclination of the predetermined angle. This is because in case that the protector body 3 is bent at the hinge portion as shown in FIG. 6, contact of the side wall 8 with the side wall 12 and also contact of the side wall 9 with the side wall 13. are prevented. Similarly, an end portion on the hinge 15 side of the side wall 9 and an end portion on the hinge 15 side of the side wall 13 are also cut off in a direction distant from the hinge 15 with inclination of the predetermined angle.

Further, the protector cover 5 is used in order to close the protector body 3, and it has a rectangular section and is formed cylindrically and straight with an opening portion. And, this protector cover 5 is composed of a first cover portion 19 which comprises a lid portion 16 and a pair of side walls 17, 18 that are erectly formed on both sides of this lid portion 16 and which covers the first housing portion 10; a second cover portion 23 which comprises a lid portion 20 and side walls 21, 22 that are erectly formed on both sides of this lid portion 20, and which closes the second housing portion 14; and a hinge 24 for joining the first cover portion 19 and the second cover portion 23 so that they can be bent.

Further, at the lid portion 16 of the first cover portion 19 of the protector cover 5, as shown in FIG. 6, a curved surface 32 is formed so as to protrude on the opening portion side by a predetermined distance from a joint end portion 31 to the hinge 24. This curved surface 32, if a bending angle of the first cover portion 19 and second cover portion 23 is previously known, can be previously formed with proper curvature according to its bending angle. Further, by setting the curvature of the curved surface 32 to a maximum bending angle (for example, 90°). of the first cover portion 19 and second cover portion 23, this curved surface 32 can correspond to all the bending angles.

Further, at the lid portion 20 of the second cover portion 23 of the protector cover 5, as shown in FIG. 6, a curved surface 34 is formed so as to protrude on the opening portion side by a predetermined distance from a joint end portion 33 to the hinge 24. This curved surface 34, if a bending angle of the first cover portion 19 and second cover portion 23 is previously known, can be previously formed with proper curvature according to its bending angle. Further, by setting the curvature of the curved surface 34 to a maximum bending angle (for example, 90°) of the first cover portion 19 and second cover portion 23, this curved surface 34 can correspond to all the bending angles.

The curved surfaces 32, 34 are provided for the first cover portion 19 and the second cover portion 23 in FIG. 6. However, it is not always necessary to provide them for both of the first and second cover portions 19, 23 but the curved surface may be provided for either the first cover portion 19 or the second cover portion 23.

In case that the protector cover 5 is attached to the protector body 3 in the state where this wire harness 2 is stored in the protector body 3, the wire harness 2 stored in the first housing portion 10 of the protector body 3 and bent at the portion of the hinge 24 is somewhat pushed up by the curved surface 32 formed at the lid portion 16 of the first cover portion 19, so that bending of the wire harness 2 becomes gentle and the wire harness is supported by the hinge 24. Therefore, it is prevented that the bending of the wire harness 2 becomes sharp. Further, the wire harness 2 stored in the second housing portion 14 is somewhat pushed up by the curved surface 34 formed at the lid portion 20 of the second cover portion 23 and the bending of the wire harness 2 becomes gentle.

Since the curved surface 32 is formed at the lid portion 16 of the first cover portion 19 and the curved surface 34 is formed at the lid portion 20 of the second cover portion 23 as described above, it is possible to make the bending of the wire harness 2 large (to make the bending of the wire harness 2 gentle), to prevent the wire harness 2 from being stretched at the bending portion, and to prevent the wire harness 2 from receiving the excessive bending stress at the bending portion. Further, since it is possible to prevent the wire harness 2 from being stretched at the bending portion and to make the bending of the wire harness 2 gentle, the outward appearance of the bending portion of the hinge 24 can be made good.

Further, since the protector cover 5 has the rectangular section and it is formed cylindrically with the opening portion upward and straight, in case that it is injection-molded, molding is performed only once. Therefore, cost of the mold can be reduced and productivity of the protector can be improved.

Since the invention is constituted as described above, the following effects can be obtained.

According to the present invention, it is possible to prevent the electric wires stored in the member which is bent and laid according to the shape of the side on which the member is fixed from receiving the excessive bending stress at the bending portion.

According to the present the invention, it is possible to prevent the electric wires stored in the protector which is bent and laid according to the shape of the side on which the protector is fixed from receiving the excessive bending stress at the bending portion.

What is claimed is:

1. A hinge structure comprising:

a first member having a first non-planar rigid surface;

a second member, at least one of said first and second members including side walls extending erectly from both sides thereof, the sidewalls defining therebetween an opening portion;

a first hinge member contiguously connecting said first non-planar rigid surface and said second member; and a protector portion for storing a wire harness including a first housing portion, a second housing portion and a second hinge member joining said first housing portion and said second housing portion, wherein said first member, said second member and said first hinge member cover said protector portion.

2. A hinge structure according to claim 1, wherein each of said first and second housing portions comprise side walls extended erectly from both sides thereof defining an opening portion.

3. A hinge structure according to claim 1, wherein said second hinge member extends a length between a first and second edge, wherein said first edge is connected to said first housing portion, and said second edge is connected to said second housing portion.

4. A hinge structure according to claim 3, wherein said second hinge member comprises an elastically deformable normally flat plate.

* * * * *